Oct. 20, 1964 C. KLEESATTEL 3,153,338
RESONANT SENSING DEVICES
Filed Nov. 22, 1961 2 Sheets-Sheet 1

INVENTOR
CLAUS KLEESATTEL
BY
ATTORNEY

Oct. 20, 1964    C. KLEESATTEL    3,153,338
RESONANT SENSING DEVICES
Filed Nov. 22, 1961    2 Sheets-Sheet 2

INVENTOR
CLAUS KLEESATTEL
BY
ATTORNEY

United States Patent Office 3,153,338
Patented Oct. 20, 1964

3,153,338
RESONANT SENSING DEVICES
Claus Kleesattel, 9841 64th Road, Forest Hills, N.Y.
Filed Nov. 22, 1961, Ser. No. 154,235
9 Claims. (Cl. 73—67.1)

This invention relates generally to resonant sensing devices which can be used either to determine or test the physical properties or characteristics of a test piece or to determine the magnitude of an applied force, as in a dynamometer, scale or load indicator.

Sensing devices embodying the invention are based upon the discovery that the resonant frequencies of a mechanical resonating member held in steady contact with a test piece or abutment are dependent upon physical properties of the test piece, more specifically, the surface compliance and mechanical impedance thereof, and also to some extent upon the force acting to hold the resonating member in steady contact with the test piece or abutment.

It is an object of the invention to provide resonant sensing devices which functionally embody the above discovery and which are operative to either quantitatively or comparatively indicate physical properties of a test piece or to provide a measurement of an applied force, as in a dynamometer, scale or load indicator.

Sensing devices embodying the invention generally comprise mechanical resonating means, electro-mechanical means for effecting virbation of the mechanical resonating means at resonant frequencies of the latter, and means for applying a force urging the mechanical resonating means into steady contact with a test piece or other abutment member so as to alter the resonant frequency of the mechanical resonating means as a function of the applied force and of physical properties of the test piece or abutment member, namely, the surface compliance and mechanical impedance of the latter.

In the case of resonant sensing devices intended to indicate the physical characteristics of a test piece, the mechanical resonating means may be held in steady contact with a surface of the test piece by a predetermined constant force, while energizing signal fed to the electro-mechanical means for effecting vibration of the mechanical resonating means is tunable to permit resonant vibration of the mechanical resonating means when in the free or unloaded condition, and also when the mechanical resonating means is held by such predetermined force against the test piece, and indicating means are further provided for indicating the frequency of vibration of the mechanical resonating means so that the difference between the resonant frequency in the free or unloaded condition and the resonant frequency of the mechanical resonating member when the latter is held in steady contact with the test piece can be measured as a function of the surface compliance and mecahnical impedance of the test piece.

Alternatively, sensing devices intended for indicating the surface compliance and mechanical impedance of a test piece may employ electro-mechanical energizing means operative at a fixed frequency for effecting resonant virbation of the mechanical resonating means, while the mechanical resonating means has a rounded tip held in steady contact with the test piece by an adjustable force so that the area of contact of the tip of the mechanical resonating means with the test piece is varied by adjustment of the force to cause the mechanical resonating means to be resonant at the operating frequency of the electro-mechanical energizing means, and are further provided with means indicating the magnitude of the adjustably applied force as a measure of the surface compliance and/or mechanical impedance of the test piece.

In the case of sensing devices embodying the invention and intended for measuring the magnitude of an applied force, as in a dynamometer, scale or load indicator, the force to be measured is employed to press a rounded contact tip of the mechanical resonating means against an abutment member of constant surface compliance and mechanical impedance, the electro-mechanical means for effecting vibration of the mechanical resonating means is tunable to the various resonant frequencies corresponding to the applied force which is to be measured, and the device is further provided with means for indicating the resonant frequency of the mechanical resonating means as a measure of the applied force.

In the sensing devices employing a tunable electro-mechanical energizing means for effecting vibration of the mecahnical resonating means with either a fixed applied force, where the physical properties of a test piece are to be determined, or with a variable force which is to be determined or measured, tuning of the electro-mechanical energizing means may be effected manually with the aid of a meter indicating the resonant condition, or tuning may be automatically effected, for example, by feedback derived from vibrations of the mechanical resonating means and controlling the energizing means.

The above, and other objects, features and advantages of the invention, will be apparent in the following detailed description of several illustrative embodiments thereof which is to be read in connection with the accompanying drawings forming a part hereof, and wherein.

Figure 12:
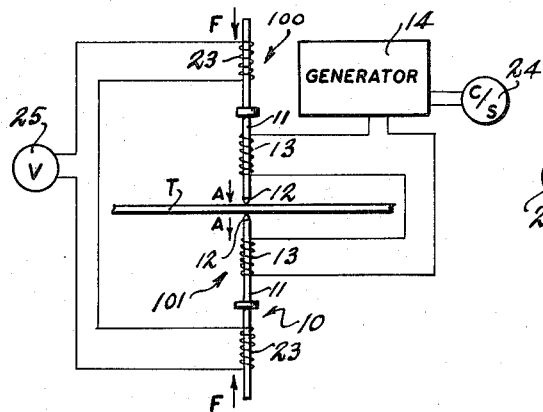
Figure 13:
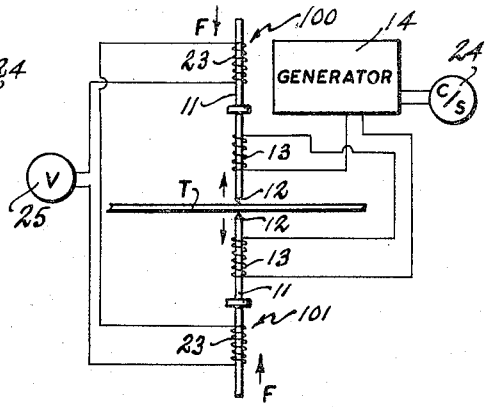
Figure 11:
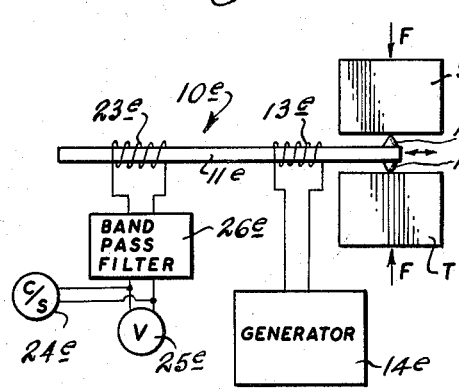

FIG. 11 is a schematic view illustrating a sensing device embodying the present invention for use in comparing the surface shear compliance of a test piece with that of a standard piece; and FIGS. 12 and 13 are diagrammatic representations of sensing devices embodying the present invention and intended for use in measuring only the mechanical impedance and only the surface compliance, respectively, of a test piece.

Figures 1, 2, 3, 4, 5:
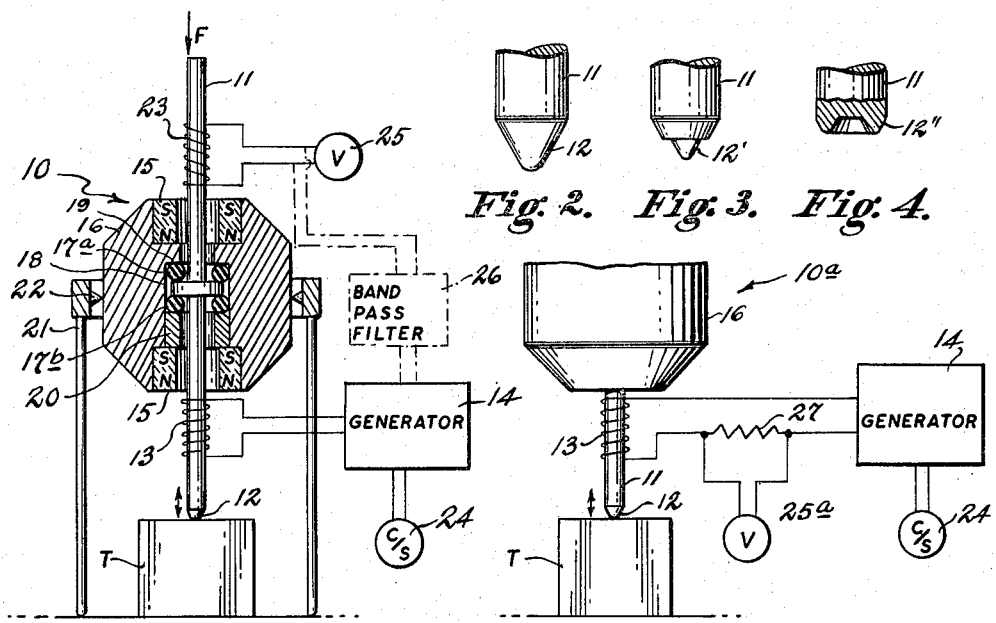
FIG. 1 is a schematic, axial sectional view of a resonant sensing device for indicating the physical characteristics of a test piece.
FIGS. 2, 3 and 4 are enlarged, fragmentary detail views showing various configurations of contact tips that can be employed in the sensing device of FIG. 1.
FIG. 5 is a schematic view showing an alternative arrangement of electrical components for controlling a sensing device of the type shown in FIG. 1.

Referring to the drawings in detail, and initially to FIG. 1 thereof, it will be seen that a sensing device embodying the present invention and there generally identified by the reference numeral 10 generally includes a mechanical resonating member in the form of an elongated rod 11 having a rounded contact tip 12 at one end for steady contact with a test piece T. Electro-mechanical means are provided for effecting longitudinal vibration of the rod 11 at a resonant frequency of the latter. In the device 10, such vibration of the rod 11 is effected by forming the latter of a magnetostrictive material, for example, permanickel, nickel, permendur or other metals which have reasonably small band widths (high mechanical Q), so that the rod 11 will vibrate when subjected to the influence of an alternating electromagnetic field established by the supplying of a suitable alternating current to an energizing coil 13 from a generator of electrical oscillations 14. The magnetostrictive rod 11 may be polarized by permanent ring magnets 15 in surrounding relation to the rod, as shown in FIG. 1, or polarization may be effected by supplying a biased alternating current from the generator 14 to the energizing coil 13. The rod 11 may also be vibrated without polarization thereof, if the exciting frequency is one-half the resonant frequency of the rod.

The magnetostrictive rod 11 is dimensioned so that a loop of its longitudinal vibrational movement occurs at or near the contact tip 12, and this condition is essentially satisfied by providing the rod 11 with a length which is a whole multiple of one-half the wavelength of the compressional waves generated in the material of the magnetostrictive rod at the frquency of the alternating current supplied to the energizing coil.

The tip 12 is conveniently held in steady contact with the test piece T, that is, without separating from the latter or tapping as a result of the vibration of rod 11, by a constant applied force acting downwardly in the drive of FIG. 1, and being conveniently constituted by the mass of a weight 16 which is suspended on the rod 11. The weight 16 may accommodate the polarizing permanent magnets 15 and be assembled with respect to rod 11 by means of rubber rings 17a and 17b seating against the opposite surfaces of a radial flange 18 provided on rod 11 at a nodal point of the latter and respectively engaging an internal, downwardly facing radial shoulder 19 of the weight 16 and a retaining ring 20. The downward force F applied to rod 11 from weight 16 through resilient ring 17a is sufficiently large so that the downward acceleration of the assembly resulting from that force is greater than the upward acceleration of the contact tip 12 resulting from the longitudinal vibration of the rod, thereby ensuring the necessary steady contact of tip 12 with test piece T.

Since the device 10 is intended to sense or indicate the surface compliance and mechanical impedance of the test piece T, the vibrated rod 11 is arranged with its longitudinal axis perpendicular to the surface of the test piece contacted by tip 12, and this arrangement may be conveniently maintained by a stand 21 extending around weight 16 and having angularly spaced apart guide points 22 slidably engaged by the outer surface of the weight.

The rod 11 has a particular resonant frequency when it is vibrated in its free condition. However, when the contact tip 12 is held in steady contact with the test piece T by a force F, rod 11 has a different resonant frequency, and the change in the resonant frequency of rod 11 is a function of both the magnitude of the force F and of the surface cimpliance and mechanical impedance of the test piece T. If the force F is maintained constant, as in the device of FIG. 1, then the change in resonant frequency is a function of the surface compliance and mechanical impedance of the test piece. In order to permit determination of the change of resonant frequency as a measure of the mentioned physical characteristics of the test piece, the sensing device 10 further includes a pickup coil 23 extending around the magnetostrictive rod 11 and in which an alternating voltage is induced by reason of the vibration of the rod. Such voltage is induced at the frequency of vibration of the rod and has a magnitude corresponding to the amplitude of the vibrations. In the control circuit represented schematically in full lines on FIG. 1, the electrical oscillation generator 14 is manually tunable within a siutable range of frequencies and is connected to a conventional frequency meter 24 indicating the frequency at which electrical oscillations are supplied to the energizing coil 13, while the pickup coil 23 is connected to a vacuum tube voltmeter 25 operative to indicate the magnitude of the voltage induced in the pickup coil, and hence the amplitude of the vibrations of rod 11.

In operating the above described sensing device 10, the generator 14 is initially tuned to effect resonant vibration of the rod 11 either in the free condition of the latter or with the tip 12 of the rod in steady contact with a standard piece having known physical characteristics. This initial resonant frequency is noted on the meter 24 when the voltmeter 25 shows a substantial increase in its indication corresponding to the optimum amplitude of vibration characteristic of the resonant vibration of rod 11. Thereafter, when the tip 12 of rod 11 is held in steady contact with a surface of the test piece T, the generator 14 is retuned until the voltmeter 25 again indicates that the rod 11 is being vibrated at a resonant frequency thereof, whereupon this resonant frequency is noted on the meter 24. The difference between the initially noted resonant frequency and the resonant frequency during contact with the test piece T is a measure of the surface compliance and mechanical impedance of the test piece.

Alternatively, as shown in broken lines on FIG. 1, the voltmeter 25 can be eliminated and the pickup coil 23 can be connected through a band pass filter 26 to the generator 14 which is of a conventional feedback type so that the output frequency of the generator 14 is automatically varied to correspond to the resonant frequency of the rod 11 in accordance with the feedback voltage supplied to the generator from the pickup coil 23. The band pass filter 26 is selected to pass feedback only in the desired range of frequencies. With this alternative arrangement, the rod 11 is always vibrated at a resonant frequency thereof and it is only necessary to note the difference between the resonant frequencies indicated by the meter 24 under the condition of free vibration and when the rod is held in steady contact with the test piece.

Figures 6, 8:
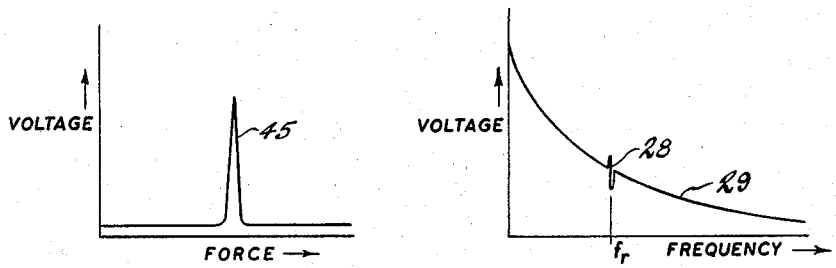
FIG. 6 is a graphic representation of the relationship between the meter indication and operating frequency in the arrangement illustrated in FIG. 5.
FIG. 8 is a graphical representation of the relationship between the meter indication and the force applied with the arrangement of FIG. 7.

Further, as shown in connection with the modified sensing device 10a of FIG. 5, the pickup coil 23 of the previously described device 10 may be eliminated, in which case manual tuning of the generator 14 is aided by a vacuum tube voltmeter 25a connected across a resistance 27 interposed between the generator and the energizing coil 13. At the resonant frequency of the vibrated rod 11, there is a sudden change in the impedance of the energizing coil 13 which results in a corresponding sudden change in the voltage drop indicated by the voltmeter 25a, as represented at 28 on the curve 29 of FIG. 6, so that the occurrence of the sudden voltage change 28 is an indication that the generator 14 has been tuned to the resonant frequency of the vibrated rod 11, and this resonant frequency can be read, as before, on the frequency meter 24.

The theoretical basis for the above statements concerning the change of the resonant frequency as a measure of the mechanical impedance and surface compliance of the test piece can be perceived from the following equation expressing the resonance condition:

(1) $$\cot \alpha = \frac{q_p + q_x}{q}\alpha - \frac{Z}{Z_x \tan \alpha_x}$$

where $$\alpha = \frac{2\pi f L}{c}$$

for the rod 11 and $$\alpha_x = \frac{2\pi f L}{c}$$

for the test piece T, with $f$ being the frequency of vibration, L being the length and $c$ being the velocity of sound in the material in each case; $q_p$ is the compliance of the tip 12; $q_x$ is the compliance of the contacted surface of the test piece; $q$ is the rod compliance $$= \frac{L}{ES}$$

in which E is Young's modulus of elasticity and S is the cross-sectional area of the rod; Z is the mechanical impedance of the rod for an infinite length thereof expressed as the product of $\rho$ the density of the material, $c$ the velocity of sound in the material and S the cross-sectional area of the rod; and $Z_x$ is the mechanical impedance of the test piece which may be similarly expressed.

There are two special cases of importance. In the first of these cases, $$Z_x \tan \alpha_x >> Z$$

which transforms Equation 1 into:

(2) $$K \approx \tan \alpha$$

where K is the compliance ratio or degree of coupling between the rod tip and test piece and can be expressed as $$\frac{q}{q_p + q_x}$$

or $$\frac{L}{ES(q_p + q_x)}$$

Since Equation 2 indicates that $\alpha$, which is a function of the resonant frequency, is determined by the compliance ratio, and since only $q_x$ is an unknown or variable in K, this is a desirable situation when the properties of the surface of the test piece are to be determined, and can be achieved by a proper choice of the frequency range.

In the second special case, $$Z_x \tan \alpha_x \ll Z$$

which transforms Equation 1 into:

(3) $$Z \tan \alpha \approx -Z_x \tan \alpha_x$$

which is the resonance condition for two mechanical resonators, and the influential quantities therein determining the resonant frequency are the length and cross-sectional area of the test piece, the density of the test piece and the velocity of sound therein.

In between the above mentioned special cases, there is a situation where both the surface compliance and the mechanical impedance of the test piece both noticeably influence the resonance frequency.

When the contact tip 12 is rounded, as shown in FIG. 2, and is pressed against the plane surface of test piece 12 by a force $F_0$, a circular area of contact is formed with a diameter $d_0$ which is proportional to the third root of $F_0$ according to the classical Hertz formula:

(4) $$d_0 \text{ prop. } \sqrt[3]{\frac{F_0 r_p}{E'}}$$

where $E'$ is a function of both $E_x$ (Young's modulus for the test piece) and $E_0$ (Young's modulus for the contact tip), and $r_p$ is the radius of curvature of the contact tip.

The equation for the normal surface compliance of the test piece derived from expressions contained in "Theory of Elasticity" by Timoshenko is as follows:

(5) $$q_x = \frac{2(1+\sigma_x)(1-\sigma_x)}{\pi d_0 E_x}$$

where $\sigma_x$ is Poisson's ratio of the test piece (approximately 0.3 for metals). Thus, the normal surface compliance is proportional to a function of the Poisson ratio, and inversely proportional to the diameter of the contact area of the test piece surface with the contact tip and to Young's modulus.

An equivalent formula for the surface compliance of the surface of the test piece is (6) $$q_x = \frac{1-\sigma_x}{\pi d_0 G_x}$$

where $G_x$ is the shear modulus.

Finally, another expression for the surface compliance is (7) $$q_x = \frac{E_x^2 C_x}{6 \pi d_0 G_x^2}$$

where $C_x$ is the compression modulus of the test piece.

From the above, it follows that the sum of the two compliances $q_x$ and $q_p$ is a direct function of $$\frac{1}{\sqrt[3]{F_0}}$$

Since $q_x$ and $q_p$ determine the coupling factor K, as previously indicated, and since the coupling factor K determines the resonant frequency $f_r$ (as in Equation 2), it becomes apparent that the resonant frequency $f_r$ is influenced by the applied static force $F_0$.

Thus, instead of applying a constant force and varying the frequency of the electrical oscillations supplied to the exciting coil 13, with the measurement of the change of resonant frequency being an indication of the physical characteristics of the test piece, as in the previously described embodiments of the invention, the electrical oscillations may be supplied at a constant frequency above the free, free resonance of the rod or at which the rod is resonant when urged against a standard piece of known characteristics by a predetermined force, and such force is adjusted when the rod contacts the test piece to again cause the rod to resonate at the fixed frequency, with the change in force being a measure or indication of the physical charcteristics of the test piece.

Figure 7:
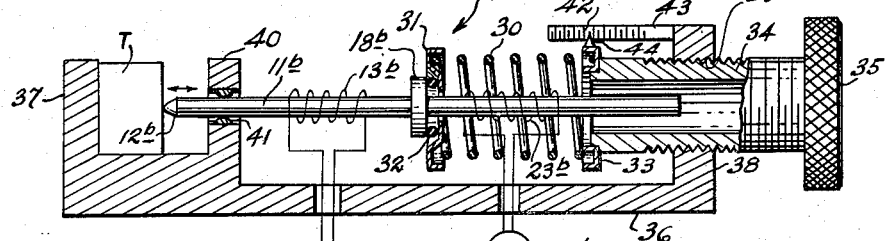
FIG. 7 is a schematic, axial sectional view of a sensing device for indicating the physical characteristics of a test piece in accordance with another embodiment of the invention.

A device of the type referred to above is illustrated in FIG. 7 and there generally identified by the reference numeral 10b. The device 10b generally includes a magnetostrictive rod 11b having a rounded tip 12b for contact with the test piece T, and being vibrated in response to the supplying of a biased alternating current at a suitable constant frequency to the exciting or energizing coil 13b from an electrical oscillation generator 14b. The force for holding the tip 12b in steady contact with a surface of the test piece T is provided by a compression spring 30 abutting, at one end, against an annular spring holder 31 seating through a rubber ring 32 against a radical flange 18b at a nodal point of the rod 11b. The other end of spring 30 seats against an annular spring holder 33 which is carried by an externally threaded sleeve 34 having a knurled head 35. The device 10b may further include a frame 36 having a wall 37 at one end to confine the test piece T, and a wall 38 at the other end formed with a tapped hole 39 through which the threaded sleeve 34 extends. The frame 36 further preferably has an intermediate wall 40 formed with an aperture 41 in which the rod 11b is longitudinally guided.

It will be apparent that rotation of the head 35 of threaded sleeve 34 serves to longitudinally move the latter relative to frame 36, and thereby vary the force exerted by spring 30 against rod 11b for urging the contact tip of the latter against the test piece T. The value of the spring force may be conveniently indicated by a suitably calibrated scale 42 provided on an element 43 extending from wall 38 and cooperating with an index or pointer 44 extending from the spring holder 33. The sensing device 10b is completed by a pickup coil 23b extending around rod 11b and connected to a vacuum tube voltmeter 25b.

In opearting the device 10b, a standard piece of known physical characteristics may be initially engaged by the rod 11b and the force exerted by spring 30 is adjusted until resonance of the rod is achieved at the frequency of the electrical oscillations supplied by generator 14b. The occurrence of resonance is indicated by the voltmeter 25b which shows a peak output voltage from the pickup coil 23b, as indicated at 45 on FIG. 8, for a particular spring force which is read on scale 42. Thereafter, the unknown test piece T is substituted for the standard piece, and the procedure is repeated, with the difference between the spring force required to effect resonance of the rod 11b in contact with the standard piece and the spring force required to effect resonance when the rod is in contact with the test piece being an indication or measure of the physical characteristics of the test piece as compared with those of the known or standard piece.

The shape and material of the contact tip of the rod or resonating member varies the relationship between change of force and change of contact area with the test piece. Thus, in the case of a relatively soft material in the test piece, a tip of relatively large radius may be used, or the tip may be annular, as at 12″ in FIG. 4, whereas, a test piece of hard material may require a tip 12′ with a hardened insert, for example, of tungsten carbide, diamond or sapphire, as in FIG. 3, having a small radius of curvature.

Figure 9:
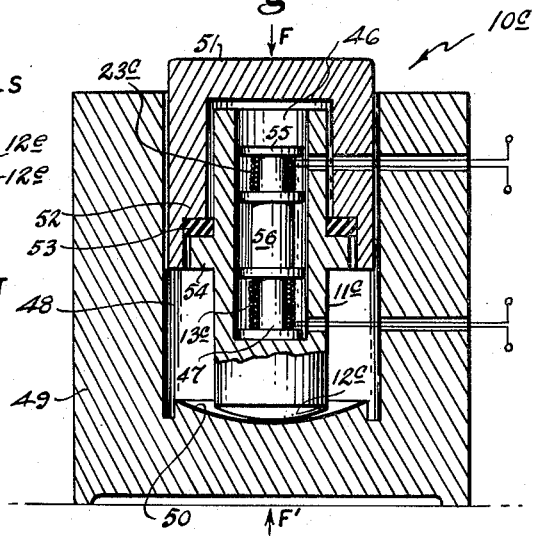
FIG. 9 is an axial sectional view of a scale or dynamometer embodying the present invention and adapted for measuring a compressive load.

Further, since a change in the force urging the mechanical resonant member against another member produces a corresponding change in the contact area therebetween and thereby alters the resonant frequency of the mechanical reasonating member, the change in the resonant frequency can be used as an indication or measurement of the magnitude of the force, as in a dynamometer, scale or load indicator. Thus, as shown in FIG. 9, a sensing device embodying the present invention and there generally indicated by the reference numeral 10c may include a magnetostrictive resonant member 11c having a rounded contact end 12c and formed with an axial cavity 46 in which the exciting or energizing coil 13c is disposed on a spool or holder 47. The resonating member 11c is in turn disposed in the upwardly opening cavity 48 of a cup-like base 49 and has its rounded end 12c in contact with a seat 50 at the bottom of base 49 which is formed with a relatively large radius of curvature so that the area of contact between rounded end 12c and seat 50 increases in response to downward loading of the resonating member 11c.

The load or force F which is to be measured is applied to the device 10c through a cap or hollow plunger 51 which extends over the upper end of resonating member 11c and is freely movable within the cavity 48 of base 49. The lower end of plunger 51 is counterbored to define a radial shoulder 52, and a rubber ring 53 is disposed between the shoulder 52 and a radial flange 54 extending from resonating member 11c at a nodal point of the latter. Thus, the load or force F applied to the plunger 51 is transmitted through ring 53 and flange 54 to resonating member 11c for pressing the lower rounded end 12c of the latter against the seat 50. A pickup coil 23c on a spool or holder 55 is also disposed within the cavity 46 of resonating member 11c and is suitably located by a spacer 56 resting on the spool 47 of the energizing coil.

As in the case of the sensing device 10 described above with reference to FIG. 1, the energizing coil 13c is supplied with biased alternating current at an adjustable frequency from a tunable electrical oscillation generator (not shown) having a frequency meter (not shown) associated therewith which may be suitably calibrated to directly indicate the applied force. Further, the pickup coil 23c is connected to a vacuum tube voltmeter (not shown).

Since the physical characteristics of the resonating member 11c and of the base 49, which corresponds to the test piece T in the previously described embodiments of the invention, are all constant, the only influential variable in determining the resonant frequency is the magnitude of the force or load F which varies the area of contact between end 12c and seat 50. Thus, in operating the device 10c, the base 49 is rigidly supported to provide an equal and opposite reaction F′ to the force F applied downwardly to the plunger 51 and the associated electrical oscillation generator is tuned until a peak of voltage indicated on the voltmeter connected with the pickup coil 23c shows that a resonant frequency has been achieved, and this resonant frequency is indicated on the frequency meter associated with the electrical oscillation generator as a measure of the applied force or load.

Figure 10:
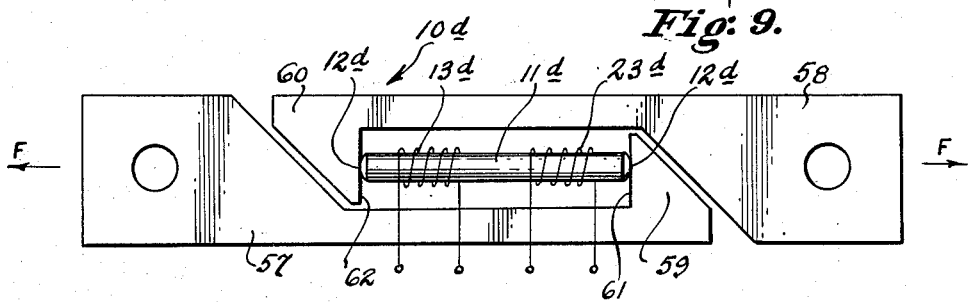
FIG. 10 is a schematic view of another dynamometer or the like embodying the invention and particularly adapted for measuring a tension load.

Although the device 10c is intended to measure a compressive load, a device may be provided in accordance with the present invention for similarly measuring a tension force or load, as indicated at 10d on FIG. 10. In this device, the load or force F to be measured is suitably applied to the ends of bars 57 and 58 having hooked ends 59 and 60 which respectively define seats or bearing surfaces 61 and 62 facing towards each other and adapted to be engaged by the rounded opposite ends or tips 12d of a magnetostrictive rod 11d forming the mechanical resonating member. An energizing coil 13d extends around the magnetostrictive rod 11d and is supplied with biased alternating current at an adjustable frequency from a tunable electrical oscillation generator (not shown) having a frequency meter (not shown) associated therewith, while a pickup coil 23d also extending around the magnetostrictive rod is connected to a vacuum tube voltmeter (not shown), as in the previously described load or force measuring device.

When the load or force to be measured is applied to the bars 57 and 58, the areas of contact of the rounded ends 12d of rod 11d with the related bearing surfaces 61 and 62 are determined by the magnitude of such force which thereby constitutes the only influential variable determining the resonant frequency of the assembly. Thus, the generator supplying alternating current to the energizing coil 13d is tuned until the voltmeter associated with pickup coil 23d indicates the attainment of resonance, and the frequency meter then indicates the resonant frequency as an indication or measurement of the applied tension load or force.

In the previously described embodiments of the invention, the contact tip or tips of the mechanical resonating member have been urged to vibrate in directions normal to the contacted surface of the test piece, as in FIGS. 1, 5 and 7, or normal to the contacted abutment surfaces 50, and 61 and 62, as in FIGS. 9 and 10. However, where it is desired to determine characteristics of the test piece which are dependent upon the shear compliance of the surface thereof, as distinguished from the normal compliance, the contact tip or tips of the mechanical resonating member may be urged to vibrate in direction parallel to the contacted surface. Thus, as shown in FIG. 11, a device embodying the present invention and there generally identified by the reference numeral 10e may include a magnetostrictive rod 11e having rounded contact tips 12e extending from the opposite sides thereof so that the contact tips are urged to vibrate in directions parallel to the longitudinal axis of the rod when the latter is energized by the feeding of biased alternating current to an exciting coil 13e from a tunable electric oscillation generator 14e. A pickup coil 23e also extends around magnetostrictive rod 11e and is connected through a band pass filter 26e to a frequency meter 24e and a vacuum tube voltmeter 25e.

The test piece T of unknown shear compliance and a standard piece S are suitably pressed against the contact tips 12e at the opposite sides of rod 11e by a constant force F. If the test piece T and standard piece S have different shear compliances, the resulting alternating torque sets up a bending wave in the magnetostrictive rod 11e, and this bending wave has a frequency twice that of the resonant frequency and is picked up by coil 23e. The band pass filter 26e is selected to pass only the second harmonic or first overtone of the resonant frequency which is measured by the frequency meter 24e and voltmeter 25e as an indication of the difference in shear compliances of the standard piece S and test piece T.

Referring now to FIG. 12, it will be seen that a test piece T, for example, in the form of a metal strip, may be disposed between two devices 100 and 101 having magnetostrictive rods 11 which are urged downwardly and upwardly, respectively, with equal constant forces F. The rods 11 are unidirectionally excited, that is, vibrated so that the contact tips 12 of the rods move upwardly and downwardly in synchronism with each other in response to the supplying of biased alternating current to the energizing coils 13 from a tunable electrical oscillation generator 14. The pickup coils 23 associated with both rods 11 are connected to the vacuum tube voltmeter 25 which indicates when the resonant frequency has been achieved by tuning of the generator 14, and this resonant frequency is indicated on the frequency meter 24. As a result of the unidirectional excitation of both rods 11, a bending wave is generated in the test piece or strip T so that the resonant frequency read on the meter 24 is mainly determined by the mechanical impedance of the test strip T, which mechanical impedance depends on the thickness of the strip and the density and velocity of sound in the material of which the same is formed. Thus, the device illustrated in FIG. 12 can be employed as a continuously operable thickness gauge.

In FIG. 13 there is illustrated an arrangement generally similar to that described above with reference to FIG. 12, with the exception that the excitations of the rods 11 of the upper and lower devices 100 and 101 are opposed, that is, the vibrations of the rods are phased so that the tips 12 thereof move in opposed directions. With the arrangement of FIG. 13, the resonant frequency read on the meter 24 is mainly determined by the surface compliance of the test strip T thereby providing a continuously operable surface hardness sensing device.

It is to be noted that the above described embodiments of the invention shown associated with test pieces may be adapted to indicate, either quantitatively or comparatively, various characteristics of the test pieces which tend to influence either the surface compliance, the mechanical impedance, or both the surface compliance and mechanical impedance of the test piece. The frequency employed for excitation of the mechanical resonating member determines those properties which are most readily measure, that is, surface properties or those extending in depth throughout the sample or embracing the entire sample or test piece, for example, its dimensions. More specifically, the sensing devices embodying the invention may indicate the natural resonance frequencies of a test piece which are related to the physical dimensions, Young's modulus, density and temperature of the test piece. Further, the described sensing devices may measure variations in the compositions of alloys, vitreous materials, plastics or the like, or in the porosity of metals, sintered materials and ceramics. The sensing devices may still further indicate the surface finish of a test piece, or the pressure or liquid level within thin walled vessels. It is also contemplated that the described sensing devices may be employed for measuring the thickness of sheet metals and strips, as specifically above described in connection with FIG. 12, or the thickness or bonding of coatings or laminations, or for discriminating between the coated and uncoated surfaces of a sample or test piece. Finally, the sensing devices embodying the invention may be employed for indicating one of two conditions, for example, contact or clearance between the vibrated mechanical resonating member and a test piece.

Although various embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A resonant sensing device for indicating the surface properties of a test piece, comprising mechanical resonating means having a contact surface with progressively increasing cross-sectional areas, electrically energized means for effecting vibration of said mechanical resonating means at a resonant frequency of the latter, means for holding said contact surface of the mechanical resonating means in steady contact with the test piece so as to cause penetration into the surface of the latter and thereby vary the resonant frequency of said mechanical resonating means, and means indicating the variation of the resonant frequency resulting from said steady contact as a function of the surface properties of the test piece.

2. A resonant sensing device for indicating surface properties of a test piece as compared with the known surface properties of a standard piece, comprising mechanical resonating means having a contact surface with progressively increasing cross-sectional areas, electrically energized means for effecting vibration of said mechanical resonating means at a predetermined resonant frequency of the latter, adjustable force applying means for holding said contact surface of the mechanical resonating means in steady contact with the standard piece and the test piece successively, and means for indicating the variation of said force required to effect vibration of said mechanical resonating means at said resonant frequency when in steady contact with the standard piece and the test piece, respectively, said variation of the force being a function of the difference between the surface properties of the pieces.

3. A force measuring device comprising mechanical resonating means having contact surfaces at its opposite ends with progressively increasing cross-sectional areas, electrically energized means for effecting vibration of said mechanical resonating means at resonant frequencies of the latter, two members urged in opposite directions by the force to be measured into steady contact with said contact surfaces of the mechanical resonating means, and means operative to indicate the change in the resonant frequency of said mechanical resonating means when vibrating freely and when subjected to said force, respectively, which change is a function of the force to be measured.

4. A resonant sensing device for indicating surface properties of a test piece, comprising mechanical resonating means having a contact surface with progressively increasing cross-sectional areas, electrically energized means tunable for effecting vibration of said mechanical resonating means at resonant frequencies thereof, means applying a predetermined force to said mechanical resonating means for holding said contact surface thereof in steady contact with a test piece, first indicating means operative to indicate resonant vibration of said mechanical resonating means, and second indicating means operative to show the frequency of vibration of said mechanical resonating means so that said electrically energized means can be tuned to effect vibration of said mechanical resonating means at resonant frequencies thereof both during free vibration of the latter and during said steady contact with the test piece and said second indicating means shows the difference between said resonant frequencies as a function of surface properties of the test piece.

5. A resonant sensing device as in claim 4; wherein said first indicating means includes pick-up means actuated by said mechanical resonating means to provide an output voltage which has a maximum value during resonant vibration of said mechanical resonating means, and a meter showing the value of said output voltage from said pick-up means.

6. A resonant sensing device as in claim 4; wherein said mechanical resonating means includes a magnetostrictive rod, said electrically energized means includes a driving coil operatively associated with said rod and oscillation generating means connected through a resistance to said driving coil to feed electrical oscillations to the latter at resonant frequencies of said rod, and said first indicating means is connected across said resistance and indicate the voltage drop across the latter which changes suddenly with correspondingly sudden changes in the impedance of said driving coil occurring at resonant vibration of said rod.

7. A resonant sensing device for indicating surface properties of a test piece, comprising mechanical resonating means having a contact surface with progressively increasing cross-sectional areas, electrically energized means tunable to effect vibration of said mechanical resonating means at resonant frequencies thereof, feed-back means operative by said mechanical resonating means and controlling said electrically energized means to tune the latter to the resonant frequency of said mechanical resonating means, means for holding said contact surface of the mechanical resonating means in steady contact with a test piece, and indicating means operative to show the difference between the resonant frequencies of said mechanical resonating means when in free vibration and when in said steady contact with the test piece, respectively.

8. A resonant sensing device for indicating physical properties of a test piece, comprising mechanical resonating means having a rounded contact tip, electrically energized means operative to effect vibration of said mechanical resonating means at a resonant frequency of the latter, means operative to exert an adjustable static force on said mechanical resonating means to hold said contact tip against a test piece and to vary the area of contact of said tip with the test piece, first indicating means operative to indicate the resonant condition of said mechanical resonating means, and second indicating means indicating the value of said force required to achieve said resonant condition which value is a function of the surface compliance and mechanical impedance of the contacted test piece.

9. A resonant force measuring device, comprising a mechanical resonating member having at least one rounded end, an abutment member connected by said rounded end, means for applying the force to be measured to said resonating member and abutment member to urge said rounded end against the latter and thereby vary the area of contact therebetween in accordance with the magnitude of the force, electrically energized means tunable to effect vibration of said resonating member at resonant frequencies thereof, and indicating means sensing the frequency at which said resonating member is resonant as a function of the magnitude of the applied force.

References Cited in the file of this patent
UNITED STATES PATENTS

| | | |
|---|---|---|
| 2,695,517 | Wiggins | Nov. 30, 1954 |
| 2,803,129 | Bradfield | Aug. 20, 1957 |
| 2,851,876 | Arnold | Sept. 16, 1958 |
| 3,014,364 | Crooks | Dec. 26, 1961 |
| 3,017,607 | Rubens | Jan. 16, 1962 |
| 3,045,491 | Hart | July 24, 1962 |
| 3,100,390 | Banks | Aug. 13, 1963 |
| 3,106,837 | Plumb et al. | Oct. 15, 1963 |